United States Patent
Kim et al.

(10) Patent No.: US 10,256,043 B2
(45) Date of Patent: Apr. 9, 2019

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: You Na Kim, Suwon-si (KR); Jae Yeol Choi, Suwon-si (KR); Ki Pyo Hong, Suwon-si (KR); Jong Ho Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/343,304

(22) Filed: Nov. 4, 2016

(65) Prior Publication Data

US 2017/0243695 A1    Aug. 24, 2017

(30) Foreign Application Priority Data

Feb. 22, 2016  (KR) .................. 10-2016-0020638

(51) Int. Cl.
*H01G 4/12*    (2006.01)
*H01G 4/30*    (2006.01)
(Continued)

(52) U.S. Cl.
CPC .............. *H01G 4/30* (2013.01); *H01G 4/012* (2013.01); *H01G 4/12* (2013.01); *H01G 4/248* (2013.01)

(58) Field of Classification Search
CPC ............ H01G 4/30; H01G 4/012; H01G 4/12; H01G 4/248
(Continued)

(56) References Cited

U.S. PATENT DOCUMENTS 9,196,422 B2    11/2015  Kim
2006/0203420 A1    9/2006  Okuyama
(Continued)

FOREIGN PATENT DOCUMENTS

CN    1832069 A    9/2006
CN    102683016 A    9/2012
(Continued)

OTHER PUBLICATIONS

First Office Action issued in Chinese Patent Application No. 201611060575.8, dated Jul. 10, 2018 (English translation).

*Primary Examiner* — Michael P McFadden
(74) *Attorney, Agent, or Firm* — Morgan Lewis & Bockius LLP (57) ABSTRACT

A multilayer ceramic electronic component includes a ceramic body and first and second external electrodes. The ceramic body includes an active region including a plurality of dielectric layers and first and second internal electrodes alternately disposed on surfaces of the plurality of dielectric layers to contribute to capacitance formation, and a protective layer provided on at least one of upper and lower surfaces of the active region. The first and second external electrodes are electrically connected to the first and second internal electrodes, respectively, and formed on both end surfaces of the ceramic body. The ceramic body includes a plurality of first and second dummy electrodes respectively extended from the second and first external electrodes into length-direction margin parts of the active region so as to face the first and second internal electrodes, respectively. Further, step portion absorbing layers are disposed in width-direction margin parts of the active region.

29 Claims, 5 Drawing Sheets

(51) Int. Cl.
 *H01G 4/012* (2006.01)
 *H01G 4/248* (2006.01)
(58) Field of Classification Search
 USPC ..................................................... 361/321.2
 See application file for complete search history.

(56) References Cited

U.S. PATENT DOCUMENTS

| | | | |
|---|---|---|---|
| 2012/0229952 A1* | 9/2012 | Kim | ................... H01G 4/005 361/321.2 |
| 2014/0085852 A1 | 3/2014 | Park et al. | |
| 2014/0240895 A1 | 8/2014 | Lee et al. | |
| 2014/0290999 A1 | 10/2014 | Park et al. | |
| 2017/0154733 A1 | 6/2017 | Lee et al. | |

FOREIGN PATENT DOCUMENTS

| | | |
|---|---|---|
| CN | 104319096 A | 1/2015 |
| CN | 106816312 A | 6/2017 |
| JP | 2008-016706 A | 1/2008 |
| KR | 10-2014-0106021 A | 9/2014 |

\* cited by examiner

MULTILAYER CERAMIC ELECTRONIC COMPONENT AND METHOD OF MANUFACTURING THE SAME

CROSS-REFERENCE TO RELATED APPLICATION(S)

This application claims the benefit of priority to Korean Patent Application No. 10-2016-0020638 filed on Feb. 22, 2016 in the Korean Intellectual Property Office, the disclosure of which is incorporated herein by reference in its entirety.

BACKGROUND

1. Field

The present disclosure relates to a high-capacitance multilayer ceramic electronic component, and more particularly, to a multilayer ceramic electronic component having improved withstand voltage characteristics through an improvement in a step portion in the multilayer ceramic electronic component, and a method of manufacturing the same.

2. Description of Related Art

A multilayer ceramic electronic component includes a plurality of dielectric layers that are stacked, internal electrodes disposed to face each other with respective dielectric layers interposed therebetween, and external electrodes electrically connected to the internal electrodes.

Multilayer ceramic electronic components have been widely used as components of mobile communications devices such as computers, personal digital assistants (PDAs), cellular phones, and the like, due to advantages thereof such as small size, high capacitance, ease of mounting, and the like.

Recently, in accordance with the miniaturization and multi-functionalization of electronic products, electronic components have also tended to be miniaturized and multi-functionalized. Therefore, a high-capacitance multilayer ceramic electronic component having a small size and high capacitance has been demanded.

Generally, a method of manufacturing the multilayer ceramic electronic component will be described. A ceramic green sheet is manufactured, and a conductive paste is printed on the ceramic green sheet to form an internal electrode film. Several tens to several hundreds of ceramic green sheets on which the internal electrode films are formed are stacked so as to be overlapped with each other, thereby forming a green ceramic body.

Thereafter, the green ceramic body is compressed at high temperature and high pressure to be hardened. Then, the hardened green ceramic body is subjected to a cutting process, and then plasticized, burned, and polished. Thereafter, external electrodes are formed on the green ceramic body having been subjected to the processes described above to complete a multilayer ceramic capacitor.

Recently, as the number of ceramic green sheets that are stacked has increased, product reliability has been reduced as a result of problems occurring during the stacking process and the compressing process of the ceramic green sheets.

That is, the ceramic green sheets each include an internal electrode forming part and a margin part corresponding to an internal electrode non-forming part. In a case in which the ceramic green sheets are staked and are then compressed by a predetermined pressure applied thereto, a step portion between the internal electrode forming part and the margin part (i.e., the internal electrode non-forming part) is intensified and results in a deterioration of withstand voltage characteristics.

The step portion is generated due to a difference between density of internal electrodes and dielectric layers in the internal electrode forming part and density of the margin part corresponding to the internal electrode non-forming part.

A method has been proposed of adding a separate ceramic material to a margin part of a ceramic body by a negative printing process in order to reduce the problems occurring as a result of the step portion. However, in this case, a process of printing separate ceramic slurry on the margin part (i.e., the internal electrode non-forming part) is very difficult.

In addition, the effectiveness of the method of adding a separate ceramic material to a margin part by using the negative printing process is dependent on providing the right amount of ceramic material with high precision and in placing the added ceramic material with high precision. However, in general manufacturing processes, precision is not high such that a step portion improving effect is not large due to an alignment defect between the ceramic green sheets after being stacked.

SUMMARY

An aspect of the present disclosure may provide a high-capacitance multilayer ceramic electronic component capable of having improved withstand voltage characteristics by alleviating the formation of a step portion in the multilayer ceramic electronic component. A method of manufacturing the same is also provided.

According to an aspect of the present disclosure, a multilayer ceramic electronic component may include a ceramic body and first and second external electrodes. The ceramic body includes an active region including a plurality of dielectric layers and first and second internal electrodes alternately disposed on surfaces of the plurality of dielectric layers to contribute to capacitance formation, and a protective layer provided on at least one of upper and lower surfaces of the active region. The first and second external electrodes are electrically connected to the first and second internal electrodes, respectively, and formed on both end surfaces of the ceramic body. The ceramic body includes a plurality of first and second dummy electrodes respectively extended from the second and first external electrodes into length-direction margin parts of the active region so as to face the first and second internal electrodes, respectively. Step portion absorbing layers are disposed in width-direction margin parts of the active region.

According to another aspect of the present disclosure, a multilayer ceramic electronic component may include a ceramic body and first and second external electrodes. The ceramic body includes an active region including a plurality of dielectric layers and first and second internal electrodes alternately disposed on surfaces of the plurality of dielectric layers to contribute to capacitance formation, and a protective layer provided on at least one of upper and lower surfaces of the active region. The first and second external electrodes are electrically connected to the first and second internal electrodes, respectively, and formed on both end surfaces of the ceramic body. The ceramic body includes a plurality of first and second dummy electrodes respectively extended from the second and first external electrodes into length-direction margin parts of the active region so as to face the first and second internal electrodes, respectively. Further, one or more gap parts are disposed in width-direction margin parts of the active region, and end portions of first and second internal electrodes adjacent to a gap part are bent in a direction away from the gap part in a stacking direction of the first and second internal electrodes.

According to another aspect of the present disclosure, a method of manufacturing a multilayer ceramic electronic component may include preparing ceramic green sheets, and forming internal electrode patterns on the ceramic green sheets using a conductive metal paste. Ceramic members are formed in width-direction margin parts of the ceramic green sheets to form step portion absorbing layers, and dummy patterns are formed between the internal electrode patterns. The ceramic green sheets are stacked and cut along central portions of the dummy patterns to form a ceramic body including an active region including a plurality of dielectric layers and first and second internal electrodes alternately disposed on surfaces of the plurality of dielectric layers to contribute to capacitance formation and a protective layer provided on at least one of upper and lower surfaces of the active region. First and second external electrodes are formed to be respectively electrically connected to the first and second internal electrodes. The ceramic body is further formed to include a plurality of first and second dummy electrodes respectively extended from the second and first external electrodes into length-direction margin parts of the active region so as to face the first and second internal electrodes, respectively, and the step portion absorbing layers are disposed in the width-direction margin parts of the active region.

According to a further aspect of the present disclosure, a multilayer ceramic electronic component includes a ceramic body and first and second external electrodes. The ceramic body includes an active region including a plurality of dielectric layers and first and second internal electrodes alternately disposed on surfaces of the plurality of dielectric layers to contribute to capacitance formation, and a protective layer provided on at least one of upper and lower surfaces of the active region. The first and second external electrodes are electrically connected to the first and second internal electrodes, respectively, and formed on respective end surfaces of the ceramic body. The ceramic body includes a plurality of first and second dummy electrodes respectively extended from the second and first external electrodes into length-direction margin parts of the active region so as to face the first and second internal electrodes, respectively. A gap part is provided in a width-direction margin part of the active region and, in a stacking direction of the first and second internal electrodes, a distance between two internal electrodes adjacent to the gap part and disposed on opposing sides of the gap part is larger than a distance between two other adjacent internal electrodes in the ceramic body.

According to a further aspect of the present disclosure, a multilayer ceramic electronic component includes a ceramic body including an active region including a plurality of dielectric layers and first and second internal electrodes alternately disposed on surfaces of the plurality of dielectric layers to contribute to capacitance formation. A gap part formed of an insulating material is provided between an edge portion of a first dielectric layer of the plurality of dielectric layers and an edge portion of a second dielectric layer of the plurality of dielectric layers.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, a multilayer ceramic electronic component according to an exemplary embodiment, in particular a multilayer ceramic capacitor (MLCC), will be described with reference to the accompanying drawings. However, the multilayer ceramic electronic component is not limited to being a MLCC, and other types of electronic components may also fall within the scope of the disclosure.

Figure 1:
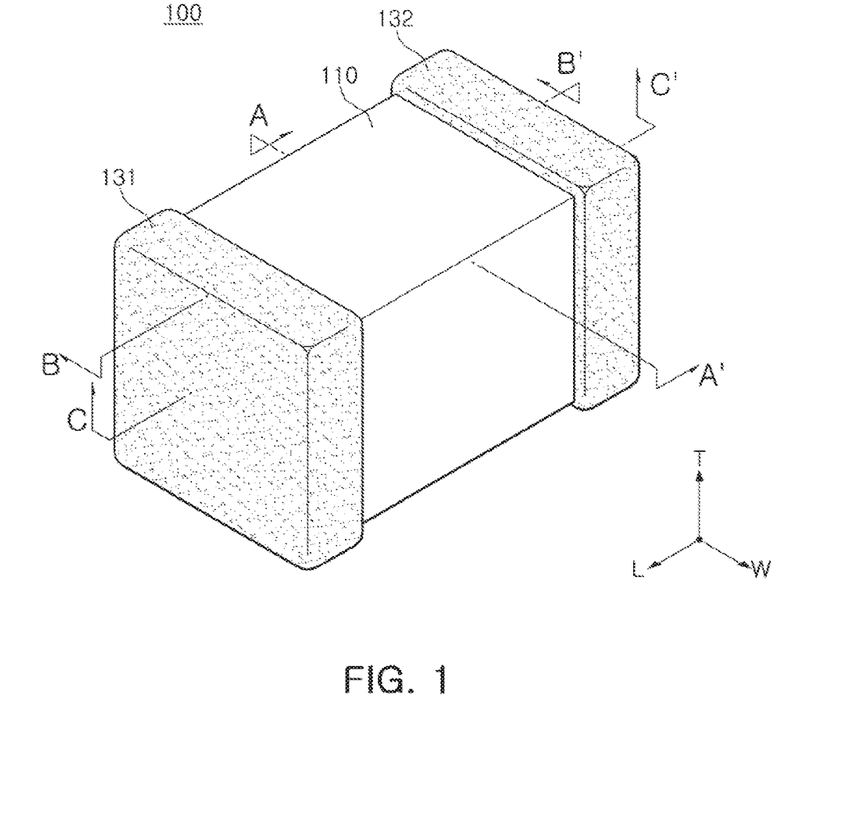
FIG. 1 is a perspective view schematically illustrating a multilayer ceramic electronic component according to an exemplary embodiment.
Figure 2:
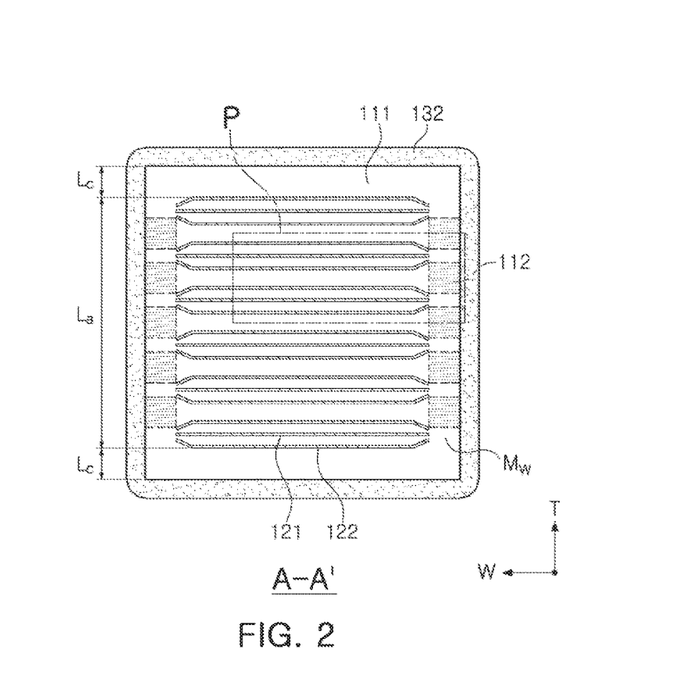
FIG. 2 is a cross-sectional view of the multilayer ceramic electronic component according to an exemplary embodiment taken along line A-A' of FIG. 1.
Figure 3:
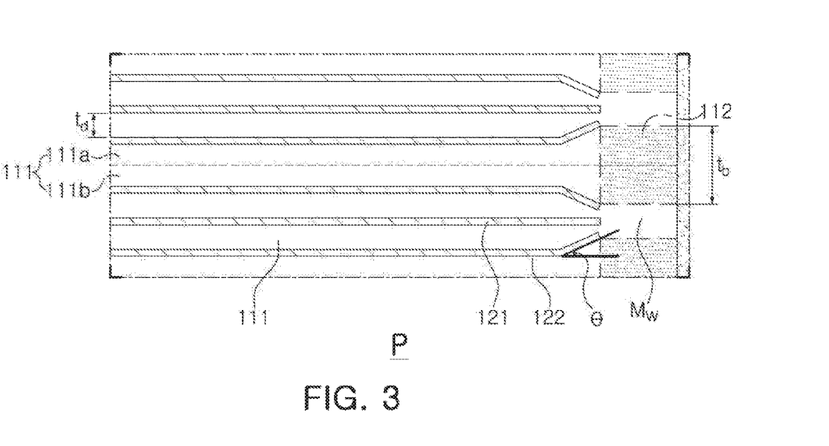
FIG. 3 is an enlarged view of region P of FIG. 2.

FIG. 1 is a perspective view schematically illustrating a multilayer ceramic capacitor according to an exemplary embodiment. FIG. 2 is a cross-sectional view taken along line A-A' of FIG. 1. FIG. 3 is an enlarged view of region P of FIG. 2.

Referring to FIGS. 1 and 2, the multilayer ceramic capacitor 100 according to an exemplary embodiment may include a ceramic body 110 in which dielectric layers 111 and first and second internal electrodes 121 and 122 are alternately stacked. First and second external electrodes 131 and 132 are electrically connected to the first and second internal electrodes 121 and 122, respectively, and formed on both end surfaces of the ceramic body 110.

According to an exemplary embodiment, a 'length direction' of the multilayer ceramic capacitor refers to an 'L' direction of FIG. 1, a 'width direction' of the multilayer ceramic capacitor refers to a 'W' direction of FIG. 1, and a 'thickness direction' of the multilayer ceramic capacitor refers to a 'T' direction of FIG. 1. The 'thickness direction' refers to a direction in which the dielectric layers are stacked, that is, a 'stacking direction' of the dielectric layers.

A shape of the ceramic body 110 is not particularly limited, and may generally be a hexahedral shape. In addition, dimensions of the multilayer ceramic capacitor are not particularly limited. For example, the multilayer ceramic capacitor may be a high-stack and high-capacitance multilayer ceramic capacitor having a size of 0.6 mm×0.3 mm and a capacitance of 1.0 μF or more.

According to an exemplary embodiment, a material forming the dielectric layer 111 may be a barium titanate (BaTiO$_3$) powder, but is not limited thereto. Therefore, ceramic additives, organic solvents, plasticizers, binders, dispersants, or the like, may be added to the dielectric layer 111.

The first and second internal electrodes 121 and 122 may be formed using a conductive paste formed of one or more selected from the group consisting of copper (Cu), nickel (Ni), silver (Ag), and silver-palladium (Ag—Pd).

The first and second external electrodes 131 and 132 may cover both end surfaces of the ceramic body 110, and may be respectively electrically connected to the first and second internal electrodes 121 and 122 that are each exposed to a respective end surface of the ceramic body 110.

The first and second external electrodes 131 and 132 may be formed by applying conductive paste portions to both end surfaces of the ceramic body 110. Here, the conductive paste may contain a metal component such as copper (Cu), glass, an organic material, and the like, as main components.

According to an exemplary embodiment, the ceramic body 110 may include an active region La including a plurality of dielectric layers 111 and the first and second internal electrodes 121 and 122 alternately disposed on one surface of each of the plurality of dielectric layers 111 to contribute to capacitance formation. A protective layer Lc is provided on at least one of upper and lower surfaces of the active region La and includes one or more dielectric layers 111.

The ceramic body 110 may be formed by stacking the plurality of dielectric layers 111 in the thickness direction.

In more detail, the ceramic body 110 may include dielectric layers 111 stacked alternately with the first and second internal electrodes 121 and 122 and disposed in the active region La so as to contribute to forming the capacitance of the multilayer ceramic capacitor. Additional dielectric layers are disposed in the protective layer Lc provided on at least one of the upper and lower surfaces of the active region La, as illustrated in FIG. 2.

A thickness of any one or more dielectric layer 111 disposed in the active region La may be arbitrarily changed depending on a capacitance design of the multilayer ceramic capacitor. In an exemplary embodiment, the thickness of one dielectric layer after being sintered may be 1.0 μm or less.

A plurality of first and second internal electrodes 121 and 122 may be disposed in the active region La of the ceramic body 110.

The first and second internal electrodes 121 and 122 may be formed and stacked on ceramic green sheets forming the dielectric layers 111, and may be formed in the ceramic body 110 with respective dielectric layers 111 interposed therebetween by sintering.

The first and second internal electrodes 121 and 122 having different polarities may be formed in pairs, and may be disposed to face each other in the stacking direction with a dielectric layer 111 disposed in the active region La interposed therebetween.

Distal ends of the first and second internal electrodes 121 and 122 may be exposed to respective outer surfaces of the ceramic body 110 in the length direction.

In the present disclosure, a region of the dielectric layer on which the internal electrode is not formed will be referenced as a margin part.

Figure 4:
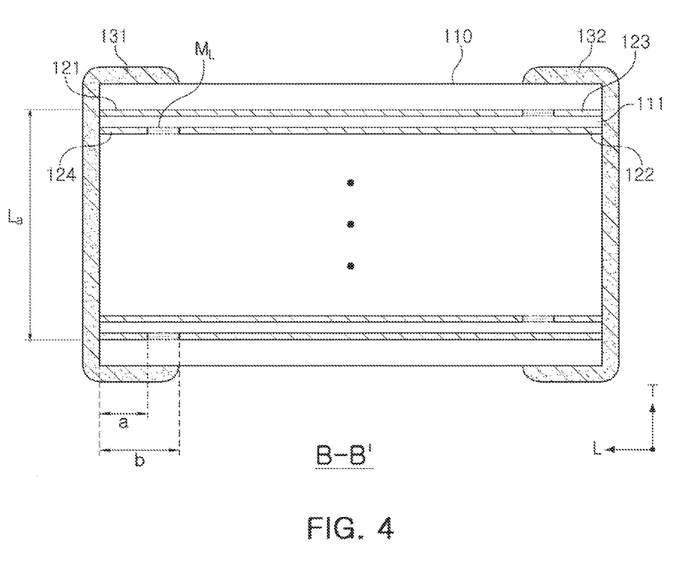
FIG. 4 is a cross-sectional view of the multilayer ceramic electronic component according to an exemplary embodiment taken along line B-B' of FIG. 1.

As illustrated in FIG. 2, margin parts formed in the width direction (the W direction) of the multilayer ceramic capacitor may be known as width-direction margin parts $M_W$, and margin parts formed in the length direction (the L direction) of the multilayer ceramic capacitor illustrated in FIG. 4 may be known as length-direction margin parts $M_L$.

That is, one dielectric layer 111 may have the length-direction margin part $M_L$ in which the first internal electrode 121 or the second internal electrode 122 is not formed, in the length direction (the L direction), and have the width-direction margin part $M_W$ in which the first internal electrode 121 or the second internal electrode 122 is not formed, in the width direction (the W direction).

Thicknesses of the first and second internal electrodes 121 and 122 may be appropriately determined depending on the purpose, or the like, and may be, for example, 1.0 μm or less.

According to an exemplary embodiment, the dielectric layers 111 constituting the ceramic body 110 may contain ceramic powder particles generally used in the related art. The dielectric layers 111 may contain, for example, $BaTiO_3$ based ceramic powder particles, but is not limited thereto. An example of the $BaTiO_3$ based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba Ti_{1-y}Zr_y)O_3$ or the like, in which Ca, Zr, or the like, that is partially dissolved in $BaTiO_3$, but is not limited thereto. An average particle size of the ceramic powder may be, for example, 0.8 μm or less, preferably, 0.05 to 0.5 μm, but is not limited thereto.

In addition, the dielectric layers 111 may contain transition metal oxide or carbide, rare earth elements, and magnesium (Mg), aluminum (Al), or the like, together with the ceramic powder particles.

According to an exemplary embodiment, step portion absorbing layers 112 may be disposed in the width-direction margin parts $M_W$ of the active region La.

A method of disposing the step portion absorbing layers 112 in the width-direction margin parts $M_W$ of the active region La is not particularly limited, and may be performed by applying a conductive metal paste onto a ceramic green sheet and then applying a ceramic material for absorbing a step portion onto a margin parts, which are regions to which the conductive metal paste is not applied in the width direction, during a manufacturing process.

Alternatively, the method of disposing the step portion absorbing layers 112 in the width-direction margin parts $M_W$ of the active region La may be performed by inserting one or more separate dielectric layers on which the step portion absorbing layers 112 are disposed into the width-direction margin parts of the active region La. In this case, the method of disposing the step portion absorbing layers 112 in the width-direction margin parts $M_W$ of the active region La may be performed by stacking a plurality of first ceramic green sheets to which conductive metal paste portions, configured to become the first and second internal electrodes 121 and 122 after being sintered, are applied, and stacking second ceramic green sheets including step portion absorbing layers formed by forming ceramic members on both end portions thereof on the first ceramic green sheets.

Recently, as the number of ceramic green sheets that are stacked is increased, product reliability has decreased as a result of problems associated with the stacking process and compressing process of the ceramic green sheets.

That is, the ceramic green sheets each include an internal electrode forming part and a margin part corresponding to an internal electrode non-forming part. In a case in which the ceramic green sheets are staked and are then compressed by a predetermined amount of pressure applied thereto, a step portion between the internal electrode forming part and the margin part (i.e., the internal electrode non-forming part) is intensified and results in a deterioration of withstand voltage characteristics.

However, according to an exemplary embodiment, the step portion absorbing layers 112 are disposed in the width-direction margin parts $M_W$ of the active region La to improve the step portion problem, whereby a high-capacitance multilayer ceramic electronic component having improved withstand voltage characteristics may be implemented.

Particularly, one or more separate dielectric layers on which the step portion absorbing layers 112 are disposed are inserted into the width-direction margin parts $M_W$ of the active region La to improve the step portion problem, whereby a high-capacitance multilayer ceramic electronic component having improved withstand voltage characteristics may be implemented.

That is, the active region La (which contributes to forming the capacitance) may have a structure in which one or more separate dielectric layers 111 having the step portion absorbing layers 112 disposed in the width-direction margin parts $M_W$ (which are the internal electrode non-forming parts) are disposed separately from the plurality of dielectric layers 111 alternately stacked and disposed with the first and second internal electrodes 121 and 122.

Referring to FIG. 2, the step portion absorbing layers 112 may be disposed in regions corresponding to the width-direction margin parts $M_W$ of the active region La in the width direction of the ceramic body.

According to an exemplary embodiment, a thickness tb of the step portion absorbing layer 112 may be ten to twenty times larger than a thickness td of the dielectric layer 111.

The step portion absorbing layer 112 may be formed at the thickness tb ten to twenty times larger than the thickness td of the dielectric layer 111, such that a step portion generated by stacking the internal electrodes may be offset and withstand voltage characteristics may be improved.

For example, in a case in which the thickness td of the dielectric layer 111 is 0.4 µm, the thickness tb of the step portion absorbing layer 112 may be 4 to 8 µm.

According to an exemplary embodiment, in the stacking direction of the first and second internal electrodes 121 and 122, end portions of two internal electrodes adjacent to the step portion absorbing layer 112 among the first and second internal electrodes 121 and 122 may be bent in a direction away from the step portion absorbing layer 112 adjacent thereto.

The direction in which the end portions of the two internal electrodes adjacent to the step portion absorbing layer 112 become distant from the step portion absorbing layer 112 adjacent thereto refers to the stacking direction of the internal electrodes 121 and 122 and/or the dielectric layers 111, that is, the thickness direction of the ceramic body, or a direction that becomes distant from the step portion absorbing layer 112, as illustrated in FIGS. 2 and 3.

That is, the step portion absorbing layers 112 having the thickness ten to twenty times larger than that of the dielectric layers 111 may be disposed in the width-direction margin parts $M_W$ of the ceramic body 110, such that the end portions of the two internal electrodes 121 and 122 adjacent to the step portion absorbing layer 112 may be bent in a compression process due to existence of the step portion absorbing layer 112.

The end portions of the internal electrodes 121 and 122 may be bent in the direction away from the step portion absorbing layer 112 adjacent thereto due to the existence of the step portion absorbing layer 112.

An angle θ at which the end portions of the two internal electrodes 121 and 122 adjacent to the step portion absorbing layer 112 are bent may be 3 to 15 degrees in relation to a stacking surface (or main surface) of the dielectric layer 111.

Internal electrodes 121 and 122 of which end portions are bent at 3 to 15 degrees in relation to the stacking surface of the dielectric layers 111 may be all of the two internal electrodes 121 and 122 adjacent to the step portion absorbing layers 112, but are not limited thereto. That is, the internal electrodes of which the end portions are bent at 3 to 15 degrees in relation to the stacking surface of the dielectric layers 111 may be some (e.g., some but not all) of the two internal electrodes 121 and 122 adjacent to the step portion absorbing layers 112.

The end portions of the two internal electrodes 121 and 122 adjacent to the step portion absorbing layer 112 are bent at 3 to 15 degree in relation to the stacking surface of the dielectric layer 111, whereby a high-capacitance multilayer ceramic capacitor having excellent withstand voltage characteristics may be implemented.

In a case in which the angle at which the end portions of the two internal electrodes 121 and 122 adjacent to the step portion absorbing layer 112 are bent in relation to the stacking surface of the dielectric layer 111 is less than 3 degrees, a capacitance is reduced, such that the high-capacitance multilayer ceramic capacitor may not be provided.

Meanwhile, in a case in which the angle at which the end portions of the two internal electrodes 121 and 122 adjacent to the step portion absorbing layer 112 are bent in relation to the stacking surface of the dielectric layer 111 exceeds 15 degrees, withstand voltage characteristics may be deteriorated.

According to an exemplary embodiment, a distance between the two internal electrodes 121 and 122 adjacent to each other and disposed adjacently to and on opposite sides of the step portion absorbing layer 112 may be greater than a distance between two other adjacent internal electrodes in the ceramic body 110.

In an exemplary embodiment, in a case of forming the step portion absorbing layers 112 by inserting one or more separate dielectric layers on which the step portion absorbing layers 112 are disposed into the width-direction margin parts of the active region La, the separate dielectric layer 111 on which the step portion absorbing layers 112 are disposed may be disposed between adjacent units including dielectric layers on which two or more internal electrodes 121 and 122 are disposed.

Therefore, the dielectric layer on which the internal electrode is disposed and the separate dielectric layer on which the step portion absorbing layer is disposed may be disposed between the two internal electrode 121 and 122 adjacent to the step portion absorbing layer 112, and only the dielectric layer on which the internal electrode is disposed may be disposed between other two internal electrodes.

Therefore, a distance between the two internal electrodes 121 and 122 adjacent to the step portion absorbing layer 112 may be larger than that between other two internal electrodes.

FIG. 4 is a cross-sectional view of the multilayer ceramic electronic component according to an exemplary embodiment taken along line B-B' of FIG. 1.

Figure 5:
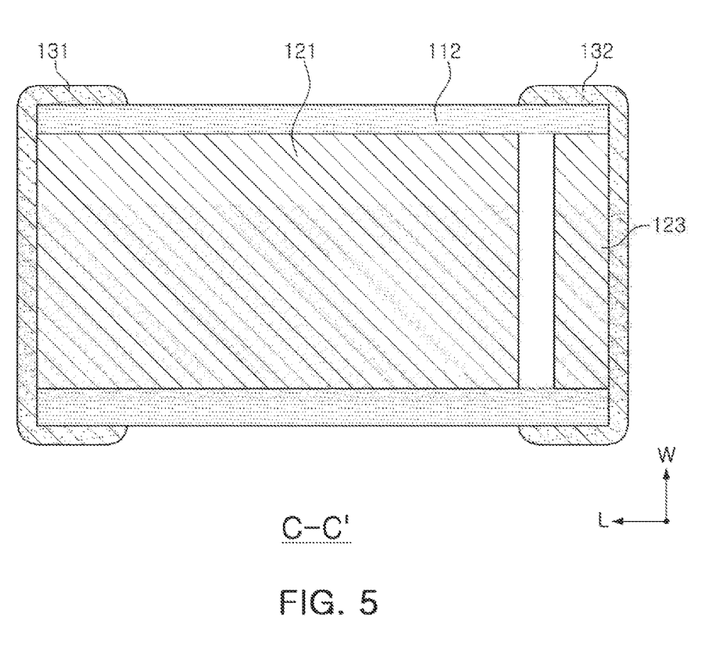
FIG. 5 is a cross-sectional view of the multilayer ceramic electronic component according to an exemplary embodiment taken along line C-C' of FIG. 1.

FIG. 5 is a cross-sectional view of the multilayer ceramic electronic component according to an exemplary embodiment taken along line C-C' of FIG. 1.

Referring to FIGS. 4 and 5, the ceramic body 110 may include a plurality of first and second dummy electrodes 123 and 124 respectively extended from the second and first external electrodes 132 and 131 to the length-direction margin parts $M_L$ of the active region La so as to face the first and second internal electrodes 121 and 122, respectively. The ceramic body 110 further includes the step portion absorbing layers 112 disposed in the width-direction margin parts $M_W$ of the active region La.

The plurality of first and second dummy electrodes 123 and 124 may have a height that is the same as or similar to that of the first and second internal electrodes 121 and 122.

In addition, since the plurality of first and second dummy electrodes 123 and 124 are disposed to be spaced apart from the first and second internal electrodes 121 and 122, respectively, the plurality of first and second dummy electrodes 123 and 124 may be electrically insulated from the first and second internal electrodes 121 and 122, respectively.

According to an exemplary embodiment, the ceramic body 110 may include the plurality of first and second dummy electrodes 123 and 124 respectively extended from the second and first external electrodes 132 and 131 to the length-direction margin parts $M_L$ of the active region La so as to face the first and second internal electrodes 121 and 122, respectively. By providing the dummy electrodes, problems related to the presence of a step portion generated by the internal electrodes may be avoided.

The first and second dummy electrodes 123 and 124 may be positioned in the active region La so as to be coplanar with the first and second internal electrodes 121 and 122, respectively.

In addition, the first and second dummy electrodes 123 and 124 may be formed by printing a conductive paste containing a conductive metal to a predetermined thickness on ceramic green sheets by the same method as the method of forming the first and second internal electrodes 121 and 122.

Here, the conductive metal may be nickel (Ni), copper (Cu), palladium (Pd), or an alloy thereof. However, the conductive metal is not limited thereto.

The first and second dummy electrodes 123 and 124 may be alternately exposed through opposite surfaces to surfaces to which the second and first internal electrodes 122 and 121 are exposed to thereby be connected to the second and first external electrodes 132 and 131, respectively.

In addition, in some examples, all of the first and second dummy electrodes 123 and 124 may be formed at the same length a. Alternatively, in other examples, some of the first and second dummy electrodes 123 and 124 may be formed at a length different from that of the others.

The purpose of the first and second dummy electrodes 123 and 124 may be to address problems related to the presence of the step portion of the multilayer ceramic electronic component 100 in the length direction to suppress generation of delamination. When a length of the first or second dummy electrode 123 or 124 is a and an interval of the length-direction margin part $M_L$ of the active region is b, $0.2 \leq a/b \leq 0.8$ may be satisfied. In detail, b may correspond to a length between the second external electrode and the first internal electrode in the length direction, or between the first external electrode and the second internal electrode in the length direction.

A ratio (a/b) of the length a of the first or second dummy electrode 123 or 124 to the interval b of the length-direction margin part $M_L$ of the active region is adjusted to be within a range of Equation: $0.2 \leq a/b \leq 0.8$ to solve the step portion problem, whereby a multilayer ceramic electronic component having excellent reliability may be implemented.

When a value of a/b is less than 0.2, the step portion is insufficiently reduced, such that an effect of suppressing generation of delamination is deteriorated, whereby the delamination may be generated in the multilayer ceramic electronic component. When a value of a/b exceeds 0.8, a step portion of the internal electrode non-forming part is rapidly generated in the length-direction margin part $M_L$ of the active region, such that reliability of the multilayer ceramic electronic component may be reduced.

A multilayer ceramic electronic component according to another exemplary embodiment may include a ceramic body 110 including an active region La including a plurality of dielectric layers 111 and the first and second internal electrodes 121 and 122 alternately disposed on one surface of each of the plurality of dielectric layers 111 to contribute to capacitance formation. A protective layer Lc is provided on at least one of upper and lower surfaces of the active region La. First and second external electrodes 131 and 132 are electrically connected to the first and second internal electrodes 121 and 122, respectively, and are formed on both end surfaces of the ceramic body 110. The ceramic body 110 includes a plurality of first and second dummy electrodes 123 and 124 respectively extended from the second and first external electrodes 132 and 131 into length-direction margin parts of the active region La so as to face the first and second internal electrodes 121 and 122, respectively. One or more gap parts 112 (also referenced as step portion absorbing layers 112) are disposed in width-direction margin parts $M_W$ of the active region La, and the first and second internal electrodes 121 and 122 adjacent to the gap part 112 are bent in a direction away from the gap part 112 in a stacking direction of the internal electrodes.

The gap parts 112 (also referenced as step portion absorbing layers 112) refer to parts formed in the width-direction margin parts of the ceramic body in a case of forming ceramic members on both end portions of ceramic green sheets corresponding to the width-direction margin parts $M_W$ of the ceramic body. The gap parts 112 are formed from the step portion absorbing layers following the stacking, compressing, and sintering of a plurality of ceramic green sheets.

In addition, since the step portion absorbing layers 112 are disposed in the width-direction margin parts $M_W$ of the ceramic body 110, end portions of two internal electrode patterns 121 and 122 adjacent to the step portion absorbing layer 112 may be bent.

Therefore, the gap parts 112 may be disposed in the width-direction margin parts $M_W$ of the ceramic body 110 in the vicinity of the bent end portions of the two internal electrodes after the ceramic body is sintered.

In addition, a distance between the two internal electrodes 121 and 122 adjacent to each other and adjacent to and disposed on opposite sides of the gap part 112 after the ceramic body is sintered may be larger than a distance between two other adjacent internal electrodes in the ceramic body.

In addition, since the gap part 112 is disposed in the vicinity of the bent end portions of the two internal electrodes in the width-direction margin parts $M_W$ of the ceramic body 110 after the ceramic body is sintered, a distance between the end portions of the two internal electrodes 121 and 122 adjacent to the gap part 112 and disposed on opposite sides of the gap part 112 may be greater than a distance between end portions of other two internal electrodes.

A distance difference between the two internal electrodes 121 and 122 adjacent to the gap part 112 (and disposed on opposite sides of the gap part 112) may be larger in the end portions of the internal electrodes than in a central portion thereof.

The reason is that the gap parts 112 are disposed in the vicinity of the bent end portions of the two internal electrodes 121 and 122 in the width-direction margin parts $M_W$ of the ceramic body 110 after being sintered.

Since other features are the same as those of the multilayer ceramic electronic component according to the exemplary embodiment described above, a description therefor will be omitted.

Figure 6:
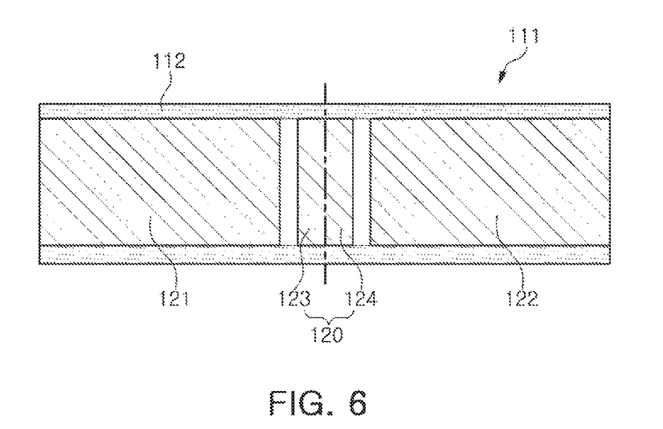
FIG. 6 is a schematic plan view illustrating one illustrative process of manufacturing the multilayer ceramic electronic component illustrated in FIG. 1.

FIG. 6 is a schematic plan view illustrating one illustrative process of manufacturing the multilayer ceramic electronic component illustrated in FIG. 1.

Figure 7:
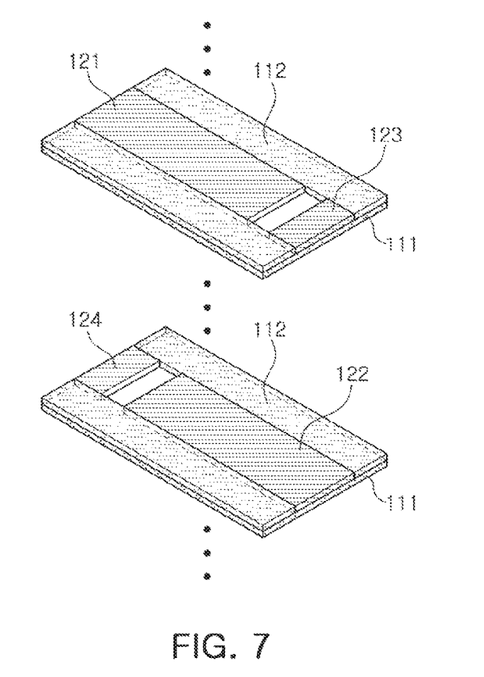
FIG. 7 is a schematic exploded perspective view illustrating a portion of the multilayer ceramic electronic component illustrated in FIG. 1.

FIG. 7 is a schematic exploded perspective view illustrating a portion of the multilayer ceramic electronic component illustrated in FIG. 1.

Referring to FIGS. 6 and 7, a method of manufacturing a multilayer ceramic capacitor according to another exemplary embodiment may include preparing ceramic green sheets, forming internal electrode patterns on the ceramic green sheets using a conductive metal paste, forming ceramic members in width-direction margin parts $M_W$ of the ceramic green sheets to form step portion absorbing layers, forming dummy patterns between the internal electrode patterns, stacking the ceramic green sheets and cutting through the stack in central portions of the dummy patterns to form a ceramic body including an active region including a plurality of dielectric layers and first and second internal electrodes alternately disposed on surfaces of the plurality of dielectric layers to contribute to capacitance formation. A protective layer can be provided on at least one of upper and lower surfaces of the active region, and first and second external electrodes can be formed to respectively electrically connect to the first and second internal electrodes.

In addition, in the multilayer ceramic electronic component manufactured by the method of manufacturing a multilayer ceramic capacitor described above, the ceramic body may include a plurality of first and second dummy electrodes respectively extended from the first and second external electrodes into length-direction margin parts of the active region so as to face the first and second internal electrodes, respectively. Step portion absorbing layers may be disposed in width-direction margin parts $M_W$ of the active region.

In the method of manufacturing a multilayer ceramic capacitor according to another exemplary embodiment, the ceramic green sheets may be first prepared.

Each ceramic green sheet may be the same as a ceramic green sheet used in a general multilayer ceramic capacitor, and may be manufactured by preparing a slurry by mixing ceramic powder particles, a binder, and a solvent with each other and printing the slurry in a sheet shape having a thickness of several μm by a doctor blade method.

The slurry may be a slurry for ceramic green sheets forming some of the dielectric layers of the active region of the ceramic body and the dielectric layers constituting the protective layer.

Meanwhile, alternatively, other ceramic green sheets that are the same as the ceramic green sheets described above and include ceramic members 112 formed on both end portions thereof so that step portion absorbing layers are formed thereon may be additionally prepared.

The ceramic members 112 may have a slurry form in which ceramic powder particles, a binder, and a solvent are mixed with each other, similar to the ceramic green sheet, but may be different in contents of a binder and a solvent from the slurry forming the ceramic green sheet.

Next, the conductive metal paste may be applied onto the ceramic green sheets to form the internal electrode patterns.

The internal electrode patterns may be formed by a screen printing method or a gravure printing method.

Next, the ceramic members may be formed in the width-direction margin parts $M_W$ of the ceramic green sheets to form the step portion absorbing layers 112.

A method of forming the ceramic members in the width-direction margin parts $M_W$ of the ceramic green sheets is not particularly limited, and may, for example, be a printing method or a punching method.

In addition, the dummy patterns 120 may be formed between the internal electrode patterns 121 and 122.

The dummy patterns 120 may become the first and second dummy electrodes 123 and 124 after the multilayer ceramic electronic component is manufactured.

Next, the ceramic green sheets may be stacked, cut along the central portions of the dummy patterns 120, and sintered to form the ceramic body including the active region including the plurality of dielectric layers and the first and second internal electrodes alternately disposed on surfaces of the plurality of dielectric layers to contribute to forming the capacitance. The protective layer may be provided on at least one of the upper and lower surfaces of the active region.

Next, the first and second external electrodes may be formed to cover both end surfaces of the ceramic body and be electrically connected to the first and second internal electrodes exposed to the end surfaces of the ceramic body, respectively.

Then, a plating process using nickel, tin, or the like, may be performed on surfaces of the external electrodes.

The following Table 1 is a comparison table showing capacitances and withstand voltage characteristics of a multilayer ceramic capacitor depending on angles at which end portions of first and second internal electrodes (e.g., 121 and 122) are bent in a stacking direction of the first and second internal electrode.

TABLE 1

| Sample No. | Bent Angle (Degree) | Capacitance | Withstand Voltage Characteristics |
|---|---|---|---|
| 1* | 1 | X | ⊙ |
| 2* | 2 | X | ⊙ |
| 3* | 3 | X | ⊙ |
| 4 | 4 | ○ | ⊙ |
| 5 | 6 | ○ | ⊙ |
| 6 | 7 | ○ | ○ |
| 7 | 8 | ○ | ○ |
| 8 | 9 | ⊙ | ○ |
| 9 | 10 | ⊙ | ○ |
| 10 | 11 | ⊙ | ○ |
| 11 | 13 | ⊙ | ○ |
| 12 | 14 | ⊙ | ○ |
| 13* | 15 | ⊙ | X |
| 14* | 18 | ⊙ | X |

*Comparative Example

In Table 1, it is indicated that a capacitance is very good (⊙) in a case in which it exceeds a target capacitance by 10% or more, is good (○) in a case in which it exceeds the target capacitance by 0.0% to 10%, and is bad (x) in a case in which it is less than the target capacitance.

In Table 1, it is indicated that withstand voltage characteristics are very good (⊙) in a case in which they exceed a target withstand voltage by 10% or more, are good (○) in a case in which they exceed the target withstand voltage by 0.0% to 10%, and are bad (x) in a case in which they are less than the target withstand voltage.

Referring to Table 1, it may be appreciated that in a case in which the angle θ at which the end portions of the first and second internal electrodes are bent is in a range of 3 to 15 degrees, a capacitance is high, withstand voltage characteristics are excellent, and reliability is improved.

On the other hand, in the cases of Samples 1 to 3 in which the angle θ at which the end portions of the first and second internal electrodes are bent is less than 3 degrees, there is a problem that a capacitance is reduced. Moreover, in the cases of Samples 13 and 14 in which the angle θ at which the end portions of the first and second internal electrodes are bent exceeds 15 degrees, there is a problem that withstand voltage characteristics are deteriorated.

As set forth above, according to the exemplary embodiments, the step portion absorbing layers 122 are disposed in the width-direction margin parts $M_W$ of the active region contributing to forming the capacitance, and the plurality of first and second dummy electrodes are disposed in the length-direction margin parts of the active region. In this way, the step portion problem is alleviated, and a high-capacitance multilayer ceramic electronic component having improved withstand voltage characteristics may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including an active region including a plurality of dielectric layers and first and second internal electrodes alternately disposed on surfaces of the plurality of dielectric layers to contribute to capacitance formation, and a protective layer provided on at least one of upper and lower surfaces of the active region; and
first and second external electrodes electrically connected to the first and second internal electrodes, respectively, and formed on respective end surfaces of the ceramic body,
wherein the ceramic body includes a plurality of first and second dummy electrodes respectively extended from the second and first external electrodes into length-direction margin parts of the active region so as to face the first and second internal electrodes, respectively, and
step portion absorbing layers are disposed in width-direction margin parts of the active region.

2. The multilayer ceramic electronic component of claim 1, wherein each step portion absorbing layer has a thickness ten to twenty times larger than a thickness of the dielectric layers.

3. The multilayer ceramic electronic component of claim 1, wherein in a stacking direction of the first and second internal electrodes, end portions of two internal electrodes adjacent to a step portion absorbing layer are bent in a direction in which the end portions become distant from the step portion absorbing layer adjacent thereto.

4. The multilayer ceramic electronic component of claim 3, wherein an angle at which the end portions of the first and second internal electrodes are bent is 3 to 15 degrees in relation to a stacking surface of the dielectric layer adjacent to the first and second internal electrodes.

5. The multilayer ceramic electronic component of claim 1, wherein a distance between two internal electrodes adjacent to the step portion absorbing layer and disposed on opposite sides of the step portion absorbing layer is larger than a distance between other two internal electrodes.

6. The multilayer ceramic electronic component of claim 1, wherein $0.2 \leq a/b \leq 0.8$ in which a is a length of the first or second dummy electrode extending from the corresponding second or first external electrode and b is a length of the length-direction margin part of the active region extending between the second external electrode and the first internal electrode or between the first external electrode and the second internal electrode.

7. A multilayer ceramic electronic component comprising:
a ceramic body including an active region including a plurality of dielectric layers and first and second internal electrodes alternately disposed on surfaces of the plurality of dielectric layers to contribute to capacitance formation, and a protective layer provided on at least one of upper and lower surfaces of the active region; and
first and second external electrodes electrically connected to the first and second internal electrodes, respectively, and formed on both end surfaces of the ceramic body,
wherein the ceramic body includes a plurality of first and second dummy electrodes respectively extended from the second and first external electrodes into length-direction margin parts of the active region so as to face the first and second internal electrodes, respectively, and
one or more gap parts are disposed in width-direction margin parts of the active region, and end portions of first and second internal electrodes adjacent to a gap part are bent in a direction away from the gap part in a stacking direction of the first and second internal electrodes.

8. The multilayer ceramic electronic component of claim 7, wherein the gap part has a thickness ten to twenty times larger than a thickness of the dielectric layers.

9. The multilayer ceramic electronic component of claim 7, wherein in the stacking direction of the first and second internal electrodes, a distance between the first and second internal electrodes adjacent to the gap part is larger than a distance between two other adjacent internal electrodes in the ceramic body.

10. The multilayer ceramic electronic component of claim 7, wherein an angle at which the end portions of the first and second internal electrodes adjacent to the gap part are bent is 3 to 15 degrees in relation to a stacking surface of the dielectric layer adjacent to the first and second internal electrodes.

11. The multilayer ceramic electronic component of claim 7, wherein $0.2 \leq a/b \leq 0.8$ in which a is a length of the first or second dummy electrode extending from the corresponding second or first external electrode and b is a length of the length-direction margin part of the active region extending between the second external electrode and the first internal electrode or between the first external electrode and the second internal electrode.

12. A method of manufacturing a multilayer ceramic electronic component, comprising:
preparing ceramic green sheets;
forming internal electrode patterns on the ceramic green sheets using a conductive metal paste;
forming ceramic members in width-direction margin parts of the ceramic green sheets to form step portion absorbing layers;
forming dummy patterns between the internal electrode patterns;
stacking the ceramic green sheets and cutting the stacked ceramic green sheets along central portions of the dummy patterns to form a ceramic body including an active region including a plurality of dielectric layers and first and second internal electrodes alternately disposed on surfaces of the plurality of dielectric layers to contribute to capacitance formation and a protective layer provided on at least one of upper and lower surfaces of the active region; and forming first and second external electrodes respectively electrically connected to the first and second internal electrodes, wherein the ceramic body includes a plurality of first and second dummy electrodes respectively extended from the second and first external electrodes into length-direction margin parts of the active region so as to face the first and second internal electrodes, respectively, and the step portion absorbing layers are disposed in the width-direction margin parts of the active region.

13. The method of claim 12, wherein each step portion absorbing layer has a thickness ten to twenty times larger than a thickness of the dielectric layers.

14. The method of claim 12, wherein in a stacking direction of the first and second internal electrodes, end portions of two internal electrodes adjacent to a step portion absorbing layer are bent in a direction in which the end portions become distant from the step portion absorbing layer adjacent thereto.

15. The method of claim 14, wherein an angle at which the end portions of the first and second internal electrodes are bent is 3 to 15 degrees in relation to a stacking surface of the dielectric layer adjacent to the first and second internal electrodes.

16. The method of claim 12, wherein $0.2 \leq a/b \leq 0.8$ in which a is a length of the first or second dummy electrode extending from the corresponding second or first external electrode and b is a length of the length-direction margin part of the active region extending between the second external electrode and the first internal electrode or between the first external electrode and the second internal electrode.

17. The method of claim 12, wherein the forming of the ceramic members in the width-direction margin parts of the ceramic green sheets is performed by a printing method or a punching method.

18. A multilayer ceramic electronic component comprising:
a ceramic body including an active region including a plurality of dielectric layers and first and second internal electrodes alternately disposed on surfaces of the plurality of dielectric layers to contribute to capacitance formation, and a protective layer provided on at least one of upper and lower surfaces of the active region; and
first and second external electrodes electrically connected to the first and second internal electrodes, respectively, and formed on respective end surfaces of the ceramic body,
wherein the ceramic body includes a plurality of first and second dummy electrodes respectively extended from the second and first external electrodes into length-direction margin parts of the active region so as to face the first and second internal electrodes, respectively, and
a gap part is provided in a width-direction margin part of the active region and, in a stacking direction of the first and second internal electrodes, a distance between two internal electrodes adjacent to the gap part and disposed on opposing sides of the gap part is larger than a distance between two other adjacent internal electrodes in the ceramic body.

19. The multilayer ceramic electronic component of claim 18, wherein the gap part has a thickness ten to twenty times larger than a thickness of the dielectric layers.

20. The multilayer ceramic electronic component of claim 18, wherein an angle at which end portions of first and second internal electrodes adjacent to the gap part are bent is 3 to 15 degrees in relation to a stacking surface of the dielectric layer adjacent to the first and second internal electrodes.

21. The multilayer ceramic electronic component of claim 18, wherein $0.2 \leq a/b \leq 0.8$ in which a is a length of the first or second dummy electrode extending from the corresponding second or first external electrode and b is a length of the length-direction margin part of the active region extending between the second external electrode and the first internal electrode or between the first external electrode and the second internal electrode.

22. A multilayer ceramic electronic component, comprising:
a ceramic body including an active region including a plurality of dielectric layers and first and second internal electrodes alternately disposed on surfaces of the plurality of dielectric layers to contribute to capacitance formation,
wherein a gap part formed of an insulating material is provided between an edge portion of a first dielectric layer of the plurality of dielectric layers and an edge portion of a second dielectric layer of the plurality of dielectric layers, and
wherein an edge portion of at least one first internal electrode adjacent to the first dielectric layer and of at least one second internal electrode adjacent to the first dielectric layer is bent with respect to a central portion of the internal electrodes in a stacking direction of the first and second internal electrodes.

23. The multilayer ceramic electronic component of claim 22, further comprising:
first and second external electrodes electrically connected to the first and second internal electrodes, respectively, and formed on respective end surfaces of the ceramic body,
wherein the ceramic body includes a plurality of first and second dummy electrodes respectively extending from the second and first external electrodes into length-direction margin parts of the active region so as to face the first and second internal electrodes, respectively.

24. The multilayer ceramic electronic component of claim 22, wherein the edge portions of the at least one first internal electrode and the at least one second internal electrode that are bent are spaced apart from an outer surface of the ceramic body.

25. The multilayer ceramic electronic component of claim 22, wherein the edge portion of the at least one first internal electrode is bent in a direction opposite to a direction in which the edge portion of the at least one second internal electrode is bent in the stacking direction of the first and second internal electrodes.

26. The multilayer ceramic electronic component of claim 22, wherein the edge portion of one first internal electrode is bent in a direction opposite to a bending direction of the edge portion of one second internal electrode adjacent to the one first internal electrode in the stacking direction.

27. The multilayer ceramic electronic component of claim 26, wherein a distance between the one first internal electrode and the one second internal electrode having the edge portions bent in opposite directions is larger than a distance between the one first internal electrode or the one second internal electrode and another internal electrode adjacent thereto.

28. The multilayer ceramic electronic component of claim 22, wherein edge portions on opposing edges of each of the at least one first internal electrode and at least one second internal electrode are bent with respect to the central portion of the internal electrode.

29. The multilayer ceramic electronic component of claim 22, wherein an angle at which the edge portions of the first and second internal electrodes are bent is 3 to 15 degrees in relation to a stacking surface of the dielectric layer adjacent to the first and second internal electrodes.

* * * * *